(12) United States Patent
Shih et al.

(10) Patent No.: US 11,609,489 B2
(45) Date of Patent: Mar. 21, 2023

(54) INKJET AND DIRECT THERMAL PRINTABLE MEDIA

(71) Applicant: CCL Label, Inc., Framingham, MA (US)

(72) Inventors: Frank Y. Shih, Arcadia, CA (US); Anahit Tataryan, Eastvale, CA (US); William J. Buehne, Highland, IN (US)

(73) Assignee: CCL Label, Inc., Framingham, MA (US)

( * ) Notice: Subject to any disclaimer, the term of this patent is extended or adjusted under 35 U.S.C. 154(b) by 748 days.

(21) Appl. No.: 16/557,185

(22) Filed: Aug. 30, 2019

(65) Prior Publication Data

US 2020/0073223 A1   Mar. 5, 2020

Related U.S. Application Data

(60) Provisional application No. 62/724,802, filed on Aug. 30, 2018.

(51) Int. Cl.
*B41J 2/335* (2006.01)
*G03C 1/73* (2006.01)
*B41J 3/54* (2006.01)

(52) U.S. Cl.
CPC .............. *G03C 1/732* (2013.01); *B41J 2/335* (2013.01); *B41J 3/546* (2013.01)

(58) Field of Classification Search
CPC ... B41J 2/335; B41J 3/546; B41J 2/01; G03C 1/732; C09D 5/00; B41M 1/34
See application file for complete search history.

(56) References Cited

U.S. PATENT DOCUMENTS

| 4,591,887 A | 5/1986 | Arbree |
| 8,460,791 B2 | 6/2013 | Hentze |

(Continued)

FOREIGN PATENT DOCUMENTS

| JP | 2003-231344 | 8/2003 |
| JP | 2003-231357 | 8/2003 |

OTHER PUBLICATIONS

U.S. International Searching Authority, International Search Report and Written Opinion for PCT/US2019/49083 dated Nov. 15, 2019.

*Primary Examiner* — Kristal Feggins
(74) *Attorney, Agent, or Firm* — McDonald Hopkins LLC

(57) ABSTRACT

Provided is a printable coating, printable media and printable labels thereof, usable in both inkjet and direct thermal printing applications. The coating comprises leuco dye blended into an inkjet coating formulation, wherein the coating is applied on the first face of an appropriate paper or film to form the printable media. The coating may be applied as a single, homogenous topcoat thereby streamlining the manufacturing process and reducing potential printing errors. The coating may provide a printable area compatible for use with both direct thermal printers and inkjet printers. On the opposite face of the paper or film, an adhesive may be applied, in combination with an optional release liner, to form printable label stock. Each step of the process, e.g. application of the coating, application of the adhesive and liner, and die-cutting of labels, may occur in any order combination relative to one another. In addition, reverse printing may also be utilized to print and form the labels.

13 Claims, 5 Drawing Sheets

(56) References Cited

U.S. PATENT DOCUMENTS

| | | |
|---|---|---|
| 2004/0147399 A1 | 7/2004 | Gore |
| 2007/0270309 A1 | 11/2007 | Iida |
| 2009/0058892 A1 | 3/2009 | VanDermark |
| 2017/0132956 A1 * | 5/2017 | Galoff .................. G09F 3/10 |

* cited by examiner

INKJET AND DIRECT THERMAL PRINTABLE MEDIA

CROSS-REFERENCE TO RELATED APPLICATIONS

This application claims priority to U.S. Provisional Patent Application No. 62/724,802 entitled "INKJET AND DIRECT THERMAL PRINTABLE MEDIA" filed on Aug. 30, 2018 which is hereby incorporated by reference in its entirety.

TECHNICAL FIELD

The present invention relates generally to a printable media that may be used in both inkjet and direct thermal printing applications.

BACKGROUND

Direct thermal and inkjet printing are two of the common digital printing processes in use today. Each process relies on different technology, requiring distinct materials and methods. Accordingly, printable media appropriate to each type of printing application may occasionally present challenges, particularly in instances where the inner workings of the equipment may not be known or readily apparent to the end user. Additionally, these differences in materials and methods restrict flexibility and convenience in being able to easily switch between printing devices without having to also change materials and methods for that particular printing device.

Direct thermal printing relies on thermally sensitive paper. Generally speaking, the paper is coated with or otherwise incorporates a thermally sensitive dye, commonly referred to as leuco dye. The color of leuco dye can be manipulated, altered, or changed by applying heat or light, or my modifying the pH. To this end, and in regard to direct thermal printing, a paper coated with leuco dye is passed across a heated printing head. The heated printing head generally comprises a plurality of individual contact points that selectively contact the leuco-coated paper. In an example, the printer sends an electric current to the heating elements of the thermal printing head, which generate heat. The leuco dye, upon contact with the contact points of the heated printing head, is heated above the melting point of the leuco-coating, resulting in a color change. When the leuco dye is heated, the reaction releases thermochromic materials within the coating and causes those portions to change color. The heat activates the thermo-sensitive coloring layer of the thermosensitive paper. By selectively contacting the leuco-coated paper with the various contact points of the heated printing head, a printed pattern may be realized. In practice, a dot-matrix array of darkened spots then forms printed information on the paper.

As such, direct thermal printing requires specialized paper. Generally speaking, these papers possess a distinctive feel and texture in comparison to other paper (e.g., letter-sized paper often used in office settings). As one non-limiting example, some thermal papers are impregnated with a combination of leuco dye and an acid. The acid is in solid form, but readily melts upon heating. In turn, the leuco dye that is selected will change from its colorless form into a visible color when it comes into contact with the melted acid. The need for dye-coated paper causes thermal printing stock to be more expensive than plain paper that would otherwise be appropriate for use in ink-jet and traditional dot-matrix impact printing.

Direct thermal printing has widespread adoption and use in printing applications where faster speed and reduced noise (relative to impact printers) are important. The equipment for direct thermal printing is also lighter, less bulky, and consumes less power than other types of printing, so as to make it a popular choice for all manner of consumer receipts and similar documentation. Fax machines also previously relied on direct thermal printing, although the need for specialized paper caused manufacturers to develop alternative solutions so as to remove the need for leuco dye-impregnated products from the office setting.

In contrast, ink printing, via inkjet or non-impact printers, has gained increasing popularity in both narrow and wide formats since late 1990s. Generally speaking, inkjet printing relies on propelling droplets of ink from the printing head onto a printable media.

The incompatibility of printable media for direct thermal and ink-based printing presents a challenge to users, particularly in instances where the user wishes to retain flexibility in selecting printing options. Further, a printable media that were relatively immune to potential user selection errors (e.g., failing to provide an appropriate media to an ink-based or thermal printer) would be welcome.

SUMMARY

Provided is a printable media, a printable label assembly, and an applicable coating thereof, usable in both inkjet and direct thermal printing applications. The coating comprises leuco dye blended into an inkjet coating formulation, wherein the coating is applied on the first face of an appropriate paper or film to form the printable media. The coating may be applied as a single, homogenous topcoat thereby streamlining the manufacturing process and reducing potential printing errors due to inconsistent application of the components of the coating. The coating may provide a printable area compatible for use with both direct thermal printers and inkjet printers. In an embodiment, an adhesive may be applied on the opposite face of the paper or film in combination with an optional release liner to form printable label stock. Each step of the process, e.g. application of the coating, application of the adhesive and liner, and die-cutting of labels, may occur in any order combination relative to one another. In addition, reverse printing may also be utilized to print and form the labels.

The coating may be applied to the printable media to allow the printable media to be processed by an inkjet or direct thermal printer. The coating for printable media may comprise a leuco dye and an aqueous mixture, wherein the aqueous mixture includes at least one of the following: a developer, a sensitizer, polyvinylpyrrolidone, polyelectrolyte, polyvinyl alcohol, latex binder, or silica. In an embodiment, the coating may be configured to be applied to a printable media to allow said printable media to be processed by both a inkjet type printer and a direct thermal type printer. In an embodiment, the leuco dye comprises a fluoran dye or, more particularly, a crystal violet lactone.

In an embodiment, the coating may be homogenous. Further, the coating may be applied as a single top coat. Applying a homogenous coating in a single top coat may streamline the manufacturing process and reduce potential printing errors due to inconsistent application of the components of the coating. Further, the aqueous mixture may include a developer, a sensitizer, polyvinylpyrrolidone, polyelectrolyte, polyvinyl alcohol, latex binder, or silica. The leuco dye may be selectively activated by applying heat or light or modifying the pH. When the leuco dye is activated, the leuco dye can effectuate a color change. Generally, this color change occurs when the coated printable media is printed. In an embodiment, the coating may be deposited on a facestock layer to provide a printable media.

In another embodiment, provided is a printable media that may comprise a facestock layer including a first face and an opposite second face and a coating applied to said first face of the facestock layer, wherein the coating comprises leuco dye and an aqueous mixture and wherein the aqueous mixture includes at least one of the following: a developer, a sensitizer, polyvinylpyrrolidone, polyelectrolyte, polyvinyl alcohol, latex binder, or silica. In an embodiment, the printable media may be configured to be processed by both a inkjet type printer and a direct thermal type printer.

The printable media may further comprise an adhesive applied to said second face of the facestock layer and a release liner applied to the adhesive to provide a printable label assembly. The printable media or label assembly may further include at least one label along the facestock layer, wherein the at least one label is selectively removable from the release liner. The facestock layer may be die cut to form the label. In an embodiment, the adhesive may be a pressure sensitive adhesive and the leuco dye may comprise a fluoran dye. The coating, and printable media or label assembly thereof comprising the coating, may be compatible for selective processing by both an inkjet and a direct thermal printer.

A method for making a label assembly for printing by both an inkjet and a direct thermal printer may comprise the steps of: forming a facestock layer; applying a coating to a first side of the facestock layer, wherein the coating comprises leuco dye and an aqueous mixture and wherein the aqueous mixture includes at least one of the following: a developer, a sensitizer, polyvinylpyrrolidone, polyelectrolyte, polyvinyl alcohol, latex binder, or silica; applying an adhesive to a second side of the facestock layer; applying a release liner onto the adhesive; and die cutting the facestock layer to form removable labels. In an embodiment, the label sheet assembly including the coating may be configured to be processed by both an inkjet type printer and a direct thermal type printer.

In an embodiment, the method may be carried out at a temperature below an activation temperature of the leuco dye wherein the leuco dye or coating may be selectively activated by heat and results in a color change upon activation. Other variables, such as applying light or modifying the pH may be done to selectively activate the leuco dye or coating. In an embodiment, the application of light or heat, or the modification of pH, may result in a color change of the coating. In an embodiment, the leuco dye may comprise a fluoran dye. Carrying out the method at a temperature less than the activation temperature of the leuco dye or coating prevents a premature color change or protonation of the dye during manufacture and prior to printing. Variables such as coating weight, line speed, oven temperature, and air flow may be manipulated to ensure viable coatings are attained. The resulting label assembly may be printable on the coating by inkjet and direct thermal printers.

Specific reference is made to the appended claims, drawings, and description below, all of which disclose elements of the invention. While specific embodiments are identified, it will be understood that elements from one described aspect may be combined with those from a separately identified aspect. In the same manner, a person of ordinary skill will have the requisite understanding of common processes, components, and methods, and this description is intended to encompass and disclose such common aspects even if they are not expressly identified herein.

DESCRIPTION OF THE DRAWINGS

Operation of the invention may be better understood by reference to the detailed description taken in connection with the following illustrations. These appended drawings form part of this specification, and any written information in the drawings should be treated as part of this disclosure. In the same manner, the relative positioning and relationship of the components as shown in these drawings, as well as their function, shape, dimensions, and appearance, may all further inform certain aspects of the invention as if fully rewritten herein.

In the drawings.

DETAILED DESCRIPTION

Figure 1:
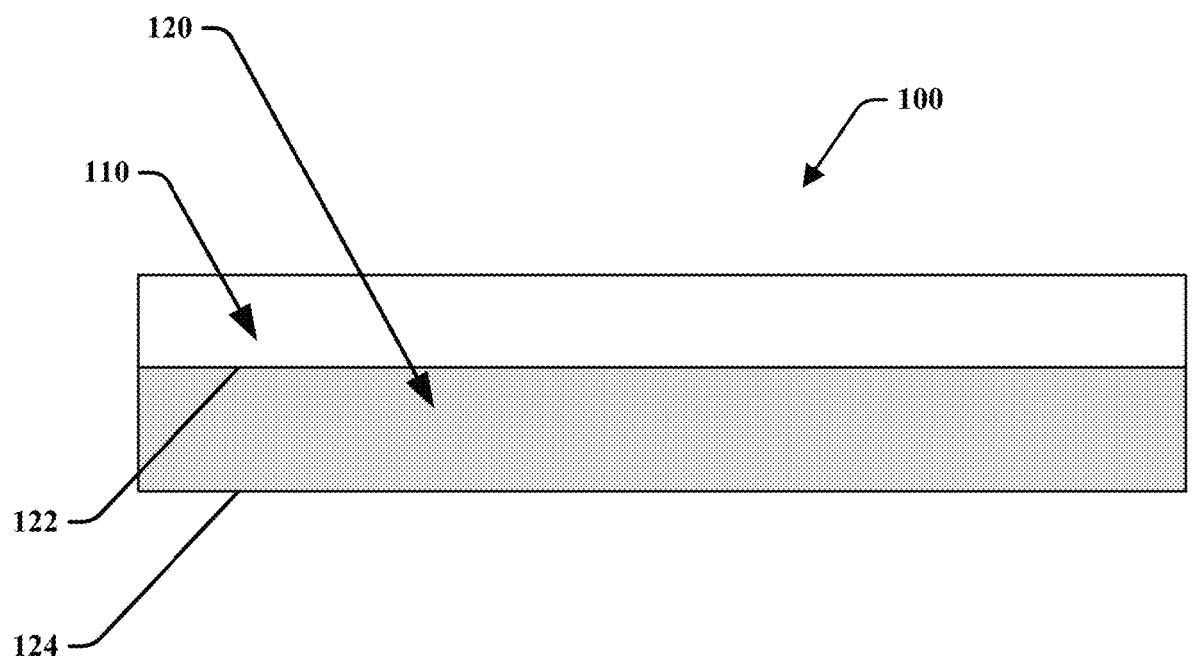
FIG. 1 is a cross sectional plan view of a printable media comprising a coating.

Reference will now be made in detail to exemplary embodiments of the present teachings, examples of which are illustrated in the accompanying drawings. It is to be understood that other embodiments may be utilized and structural and functional changes may be made without departing from the respective scope of the present teachings. Moreover, features of the various embodiments may be combined or altered without departing from the scope of the present teachings. As such, the following description is presented by way of illustration only and should not limit in any way the various alternatives and modifications that may be made to the illustrated embodiments and still be within the spirit and scope of the present teachings. In this disclosure, numerous specific details provide a thorough understanding of the subject disclosure. It should be understood that aspects of this disclosure may be practiced with other embodiments not necessarily including all aspects described herein, etc.

As used herein, the words "example" and "exemplary" means an instance, or illustration. The words "example" or "exemplary" do not indicate a key or preferred aspect or embodiment. The word "or" is intended to be inclusive rather than exclusive, unless context suggests otherwise. As an example, the phrase "A employs B or C," includes any inclusive permutation (e.g., A employs B; A employs C; or A employs both B and C). As another matter, the articles "a" and "an" are generally intended to mean "one or more" unless context suggest otherwise.

Further, unless context suggest otherwise, descriptions of shapes (e.g., circular, rectangular, triangular, etc.) refer to shapes meeting the definition of such shapes and general representation of such shapes. For instance, a triangular shape or generally triangular shape may include a shape that has three sides and three vertices or a shape that generally represents a triangle, such as a shape having three major sides that may or may not have straight edges, triangular like shapes with rounded vertices, etc.

While embodiments may refer to a particular example of the described coating and printable media as applied to, including, or comprising a label sheet, it is noted that disclosed embodiments may be applicable to various items, products, and industries. Generally, described embodiments may be utilized for any application that requires a printable media for use in printing by direct thermal printing, impact printing, ink-jet printing, and the like, including receipts, magazines, photos, office printing, home printing, label printing for products, barcodes, stickers, tickets for events or travel, etc.

Disclosed is a coating comprising a leuco dye for application onto a printable media. The printable media may include a film or facestock layer configured to receive the coating. The coating may be applied as a single topcoat. The coating may be homogenous. The coating may provide a printable area compatible for use with both direct thermal printers and inkjet printers. The film or facestock may further form a printable label assembly that includes an adhesive and a releasable liner. The coating and coated printable media may be used in both inkjet and direct thermal printing applications.

Figure 2:
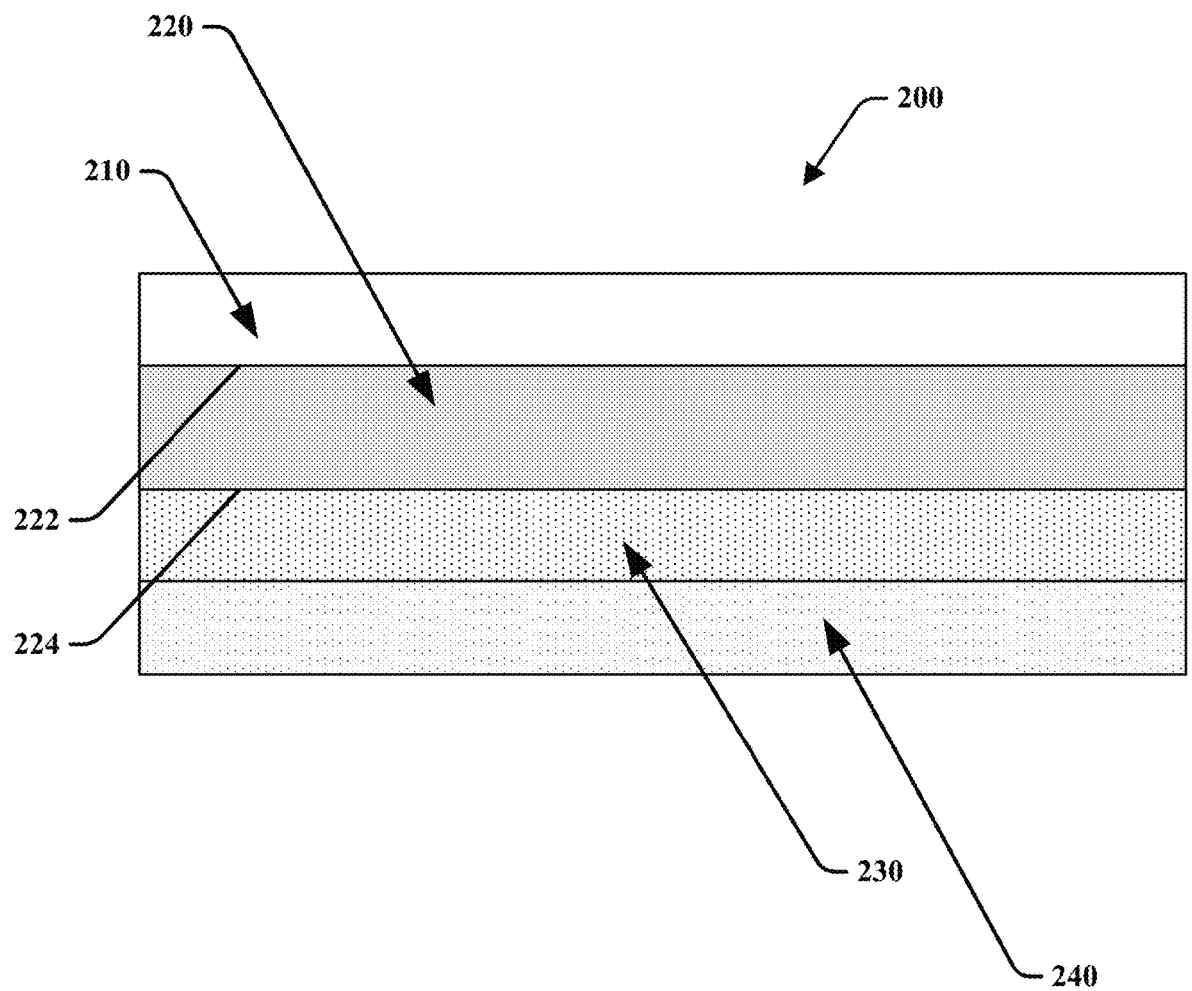
FIG. 2 is a cross sectional plan view of a printable label comprising a coating.

FIG. 1 depicts a cross sectional plan view of a printable media 100 comprising a coating 110 that enables printing onto the printable media 100 by both inkjet and direct thermal printers. Generally, the coating 110 may include a leuco dye and may be applied onto a film or facestock layer 120 to provide a printable media. In an embodiment, the printable media 100 may be a printable label 200, as shown in FIG. 2, wherein the printable label 200 includes a coating 210, a facestock layer 220, an optional adhesive 230, and an optional release liner 240. It is noted that while embodiments disclosed herein may describe a printable label 200 having an adhesive 230, release liner 240, and die cuts formed thereon to provide individual labels, the printable media 100 may comprise a coated facestock 120 for non-label applications.

The coating 110, 210 may comprise a leuco dye. The leuco dye may comprise fluoran (triarylmethane) dyes, although chemically or structurally similar dyes are also known and may be used herein. In an example, other types of leuco dyes may include spiro-lactones, dibenzofluoran analogues, phthalides, spiro-oxazine, crystal violet lactone, phenolphthalein, thymolphthalein, and the like, Leuco dyes have a propensity to change color when exposed to heat. They may also be activated, i.e. undergo protonation, when a developer compound undergoes a heat-induced change, thereby expanding the potential selection of dyes to those that are, as one example, activated by pH change (with the developer containing an appropriate acid or base that is released when exposed to sufficient heat, thereby developing the dye immediately proximate to the released developer). Other, similar developer/activation schemes are possible.

In an embodiment, the coating 110, 210 may comprise a leuco dye mixed in an aqueous mixture. The coating 110, 210 may be applied to a facestock layer 120, 220 to form a printable media 100 or a printable label 200, as shown in FIGS. 1 and 2, respectively. In an embodiment, the aqueous based mixtures and coating 110, 210 may further comprise one or more of: an appropriate developer, an optional sensitizer, polyvinylpyrrolidone (PVP), polyelectrolyte, polyvinyl alcohol, latex binder and silica. The sensitizer may further facilitate the leuco-developer interaction. The PVP, polyvinyl alcohol and latex may serve as a binder. The silica may act as an absorber to increase the drying rate for the printing. Other known substitutes for these components are possible. The coating 110, 210 may be applied as a single topcoat. The coating 110, 210 may be homogenous. In an embodiment, the coating 110, 210 is homogenous and applied as a single topcoat. As a result, the manufacturing process and method of making printable media or printable label assemblies are compatible for use with both inkjet and direct thermal printers, such compatibility may be achieved by the use of a homogenous coating applied as a single topcoat to the printable medium.

The coating 110, 210 may be applied to a first face 122, 222 of a facestock layer 120, 220 to form a printable media 100 or a printable label 200. Any suitable facestock layer for printing applications may be used, including paper stocks, film stocks including polymeric materials, nonwoven material, printing paper, paperboard, card stock, and the like, any of which may include coated-type paper appropriate for inkjet printing. In an embodiment, the facestock layer is a receipt paper roll. In another embodiment, the facestock layer is office paper. The film stock may be formed from flexible film materials including one or more layers of a polyolefin film such as, but not limited to, polypropylene, polyethylene, polymethylpentene, polybutene-1, polybutylene, poly-3-methylbutene-1, poly-pentene-1, poly-4,4 dimethylpentene-1, poly-3-methyl pentene-1, polyisobutylene, poly-4-methylhexene-1, poly-5-ethylhexene-1, poly-6-methylheptene-1, polyhexene-1, polyoctene-1, polynonene-1, polydecene-1, polydodecene-1 copolymers thereof, or any blend of two or more thereof. In an embodiment, the film stock may be a non-oriented film. The film stock may also be formed from more rigid film materials including biaxially-oriented polypropylene (BOPP).

In reference to the printable label 200, an adhesive 230 and release liner 240 may be applied to a second face 224 of the facestock layer 220 to provide a printable label 200. The facestock layer 220 may be die cut to form individual labels thereon. The release liner 240 may be siliconized so as to enable the removal of an individual label from the label sheet and release liner 240, wherein the individual label includes the adhesive 230 and facestock layer 220 with the coating 210 thereon. The adhesive 230 may be a permanent adhesive or removable adhesive. Permanent adhesives are still releasable from a release liner. The adhesive 230 may be pressure sensitive adhesives so that the label may be removed from the release liner 240 and applied to a product, shelf, object, paper, and the like by the application of pressure. The label may be able to be removed, reused, and reapplied without compromising the integrity of the label in the case of a removable adhesive, or the label may be include a more permanent adhesive that prevents removal of an applied label without compromising the integrity of the label.

Suitable adhesives 230 include those falling into the following categories: random copolymer adhesives such as those based upon acrylate and/or methacrylate copolymers, alpha-olefin copolymers, silicone copolymers, chloroprene/acrylonitrile copolymers, and the like; and block copolymer adhesives including those based upon linear block copolymers (i.e., A-B and A-B-A type), branched block copolymers, star block copolymers, grafted or radial block copolymers, etc., and natural and synthetic rubber adhesives. In one embodiment, the adhesive of the adhesive layer(s) is an emulsion acrylic-based pressure sensitive adhesive. In certain versions, the permanent adhesive is a hot melt rubber based permanent adhesive. The adhesive 230 should have a composition that will remain stable and not flow or substantially not flow when subjected to temperatures as high as 300° F. to 400° F. These characteristics facilitate printing of the sheet assembly article in a direct thermal printer, laser printer, or other high temperature printing apparatus.

While described label printing applications generally refer to direct printing on the first face 222 of the facestock layer 220 opposite the adhesive 230 and release liner 240 that are applied to the other second face 224 of the facestock layer 220, it is noted that the coating 210 may also be utilized in reverse printing applications wherein a coated facestock layer is printed, by either inkjet or direct thermal printing, and an adhesive and release layer are applied onto the printed and coated side of the facestock layer.

Figure 3:
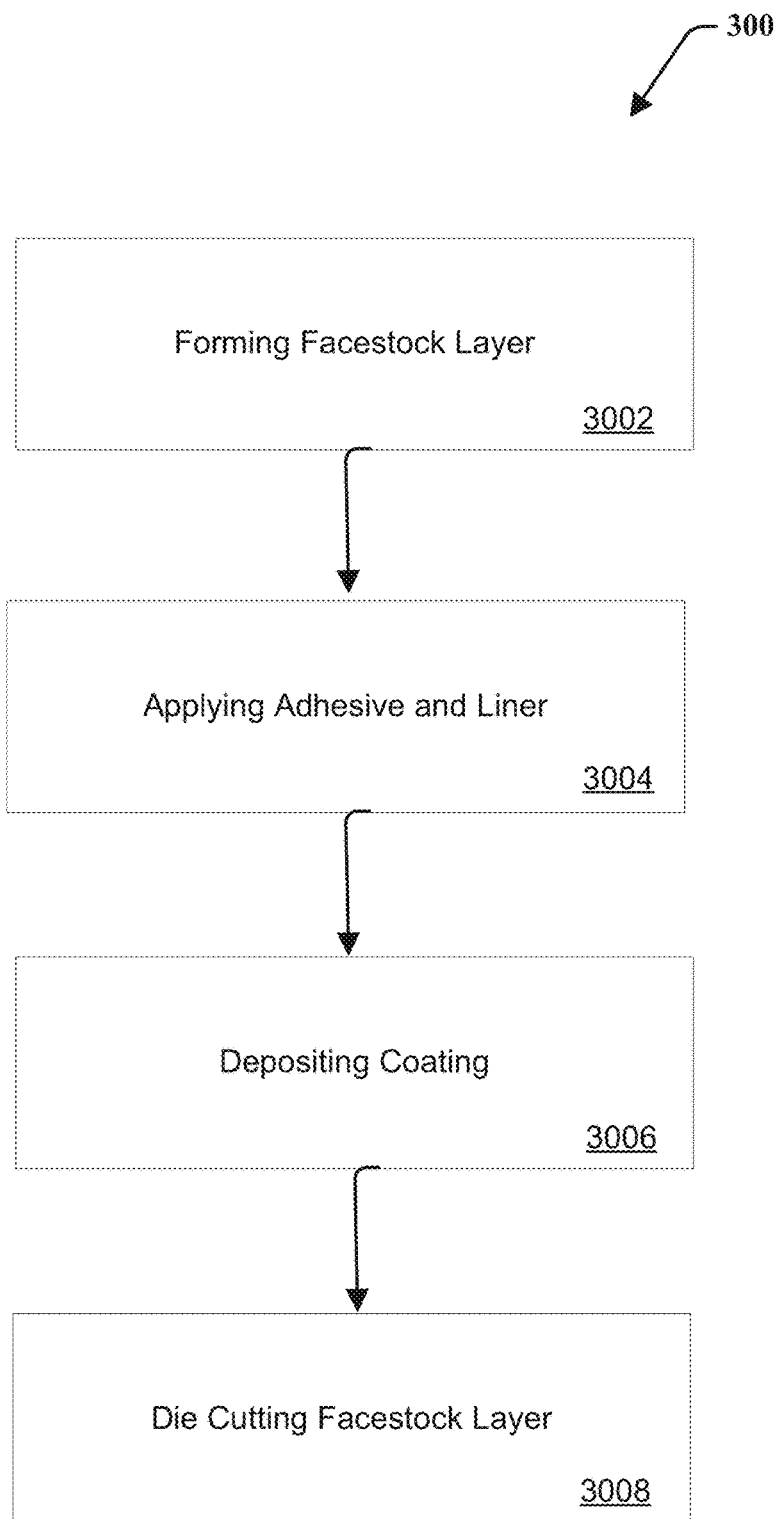
FIG. 3 is an example of a method of forming a printable label.
Figure 4:
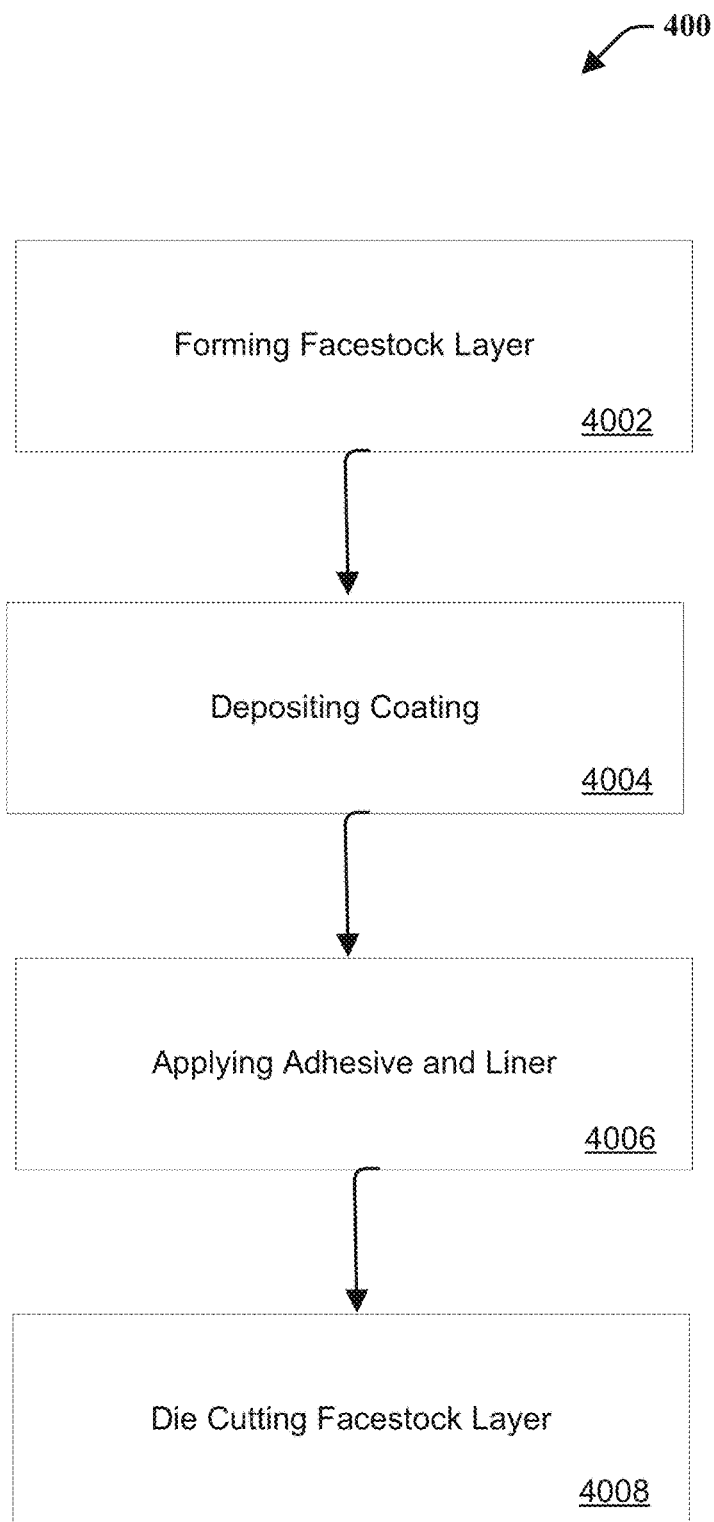
FIG. 4 is another example of a method of forming a printable label.

FIGS. 3 and 4 are flow diagrams showings exemplary embodiments of methods for forming the printable label 200 in FIG. 2 and disclosed herein.

At 3002, a facestock layer is formed. The facestock layer may comprise any suitable material including paper stocks, film stocks including polymeric materials, nonwoven material, printing paper, paperboard, card stock, and the like.

At 3004, an adhesive may be deposited on a face of the facestock layer and a release liner applied thereon to protect and preserve the adhesive prior to application. The adhesive may be a permanent adhesive or removable adhesive, and may be pressure sensitive so that a label may be removed from the release liner and applied to a product, shelf, object, paper, and the like by the application of pressure.

At 3006, a coating comprising a leuco dye mixed in an aqueous mixture may be applied on a face of the facestock layer opposite the adhesive and release liner. The coating may be applied as a single topcoat. The coating may be homogenous. The coating may provide a printable area compatible for use with both direct thermal printers and inkjet printers. The coating operation itself may be conducted by any suitable process, including, by way of non-limiting example, roll-coating, spin coating, gravure coating, dip coating, slot die, and the like.

The coating operation is generally carried out at a temperature allowing for sufficient heat to evaporate the necessary volatile compounds, but not too much heat as to exceed the protonation temperature at which the leuco dye (and/or developer) becomes activated, thereby causing the ink to take on its color prematurely. As a result, in an embodiment, the oven temperature should be below a certain threshold temperature to avoid protonation of the leuco dye and the associated color change. While embodiments may refer to a certain temperature threshold for manufacturing and activation, it is noted that the leuco dye or coating may be activated, protonated, or the color change otherwise effectuated by modifying the pH level of the aqueous solution or leuco dye, applying light, and the like as an alternative to or in addition to modifying the temperature. In these embodiments, the manufacturing of the printable media or printable label assembly would be carried out at levels below the threshold of temperature, pH, light, and the like that would cause activation of the leuco dye and premature color change prior to printing.

Activation of the leuco dye may be caused by applying additional heat, modifying the pH, or applying light in a pattern to define indicia on the printable media or printable labels. The application of heat or light, or modification of the pH, can result in protonation of the leuco dye or coating such that a color change is observed. In an embodiment, the leuco dye or coating may change from colorless to any suitable color for printing, including black, cyan, red, yellow, indigo, or the like. In this regard, the coating is able to be processed through both an inkjet printer and a direct thermal printer to define indicia on the printable media or printable label.

In addition to ensuring the coating process is carrier out in this threshold range of temperature, sufficient heat energy must still applied to affect the coating, which may depend on the precise coating process that is selected. Other variables may further influence the selected temperature. For example, coating weight, line speed, substrate properties, viscosity of the mixture, and air flow rate within the process chamber may all be adjusted to effect efficient coating.

At 3008, the facestock layer may be die cut to form at least one label. Die cutting the facestock label may include cutting the facestock layer while not cutting the release liner. It is noted that the labels may be cut to a desired shape as described herein.

As shown in FIG. 4, the application of the coating onto a side of the facestock may also occur prior to the application of the adhesive and release liner to the opposite side of the facestock. Further, the die-cutting of the labels may occur before or after the application of the coating. In this respect, each step of the process, e.g. application of the coating, application of the adhesive and liner, and die-cutting of labels, may occur in any order combination relative to one another. Additionally, as noted herein, the labels may be reversed printed wherein the coating is applied to a side of the facestock, the coating is printed thereon by an inkjet or direct thermal printer, an adhesive and liner are applied over the printing onto the same side of the facestock, and the facestock layer is die cut to form individual labels thereon.

Any manner of permanent, repositionable, and/or pressure sensitive adhesives may be used, singly or in combination. In this manner, the printed media can be converted to label for both inkjet and direct thermal printing. A release liner may be used to protect the adhesive and/or facilitate handling of the resulting label stock, particularly given its potential use as a printable media.

Figure 5:
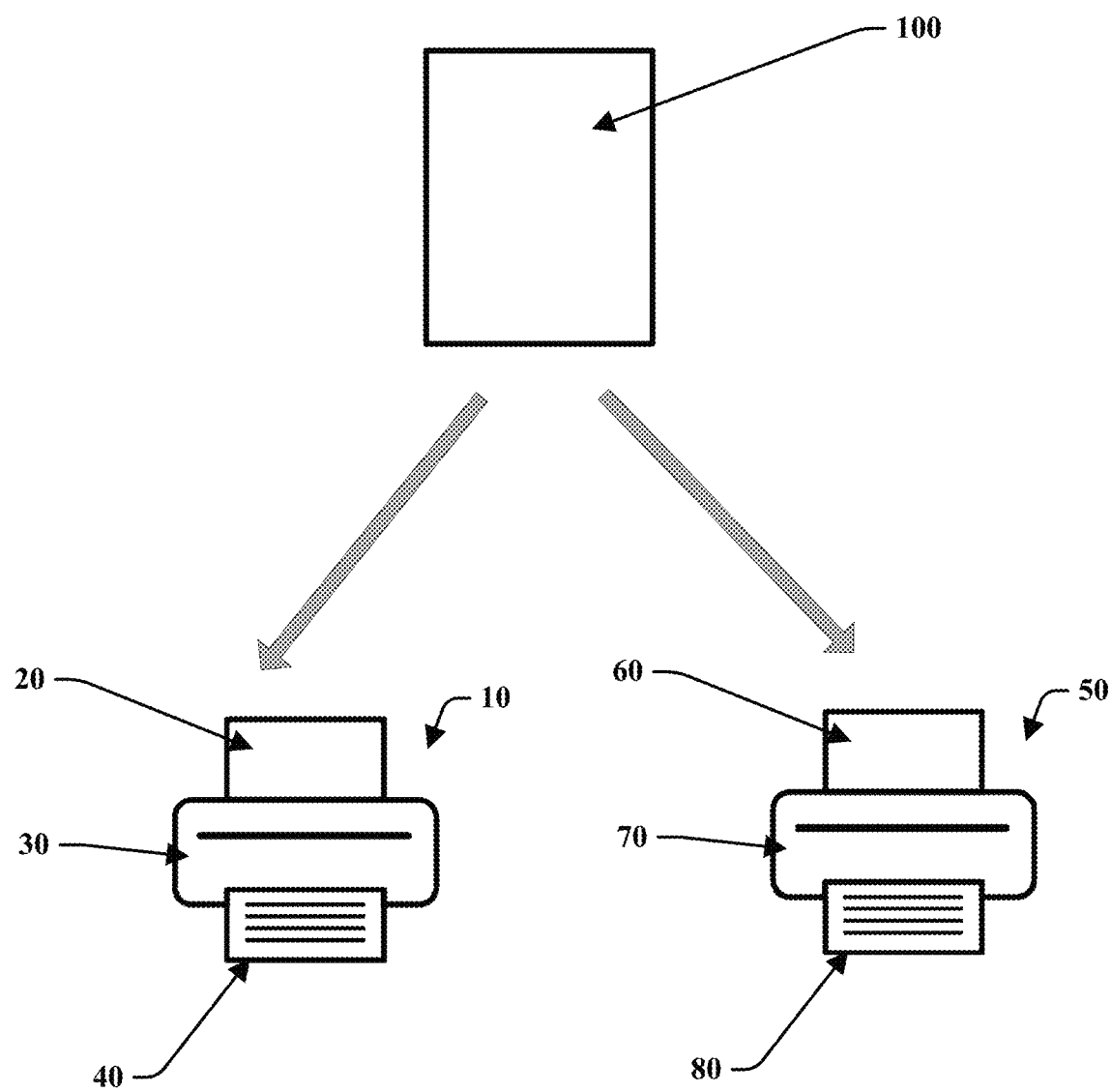
FIG. 5 is a flow diagram of the capabilities of a printable media or label.

FIG. 5 shows an exemplary printer 10 that may be used with the disclosed printable media 100 and printable labels 200. The printable media 100 and printable labels 200 are compatible for use in various printers including direct thermal printers, inkjet printers, laser printers, and the like. In an embodiment, printer 10 may be a thermal printer and may generally include a feeding mechanism 20, wherein the printable media 100 or printable labels 200 enter into the printer 10, a thermal printing mechanism 30, and an exit 40. In an embodiment, the printer 10 may include a thermal printing mechanism 30 comprising a heated printing head and a plurality of individual contact points that selectively contact the printable media 100 and printable labels 200.

In an example, the printer 30 sends an electric current to the heating elements of the thermal printing head, which generate heat. The coating 110, 210 and leuco dye therein, upon contact with the contact points of the heated printing head, may be heated above the melting point of the coating, resulting in a color change. When the leuco dye of the coating 110, 210 is heated, the reaction releases thermochromic materials within the coating 110, 210 and causes those portions to change color. The heat activates the thermosensitive coloring layer of the thermosensitive paper. By selectively contacting the coating 110, 210 of the printable media 100 and printable labels 200 with the various contact points of the heated printing head, a printed pattern may be realized. Although this embodiment refers to the printer 10 as having a thermal printing mechanism 30, it is noted that the printer may include any mechanism to apply or manipulate other variables such as light and pH, that correspond to the particular composition of the coating 110, 210. For example, the color change of the coating 110, 210 may rely on a particular light or pH threshold rather than temperature.

In addition to a thermal printer 10, the printable media 100 and printable labels 200 may also be compatible and used with an inkjet printer. In an embodiment printer 50 may be an inkjet printer and may generally include a feeding mechanism 60, wherein the printable media 100 or printable labels 200 enter into the printer 50, an inkjet printing mechanism 70, and an exit 80. In an embodiment, the printer 50 may include a ink printing mechanism 70 that includes printing heads capable of applying ink onto the printable media 100 and printable labels 200. The inkjet printer may also be used for non-impact or impact printing.

EXAMPLES

Formulation A was prepared in a container. 100 grams of Celvol 523 (10% solids), 85 gm of Crystal violet lactone, 1.5 gm of Surfynol DF75, and 100 gsm of water were mixed and grinded according to conventional means so that the particles had less than 7 micron in size. The resulting solids are 33.9%.

Formulation B was prepared in a separate container. 200 gm of Celvol 523 (10% solids), 306 gm of water, 0.2 gm of Surfynol DF75, 40 gm of p-benzyl hydroxybenzoate, 2 gm of Catiofast 269 (dye fixing agent) were mixed and grinded to less than 7 micron in size. The resulting solids are 10.75%.

Formulation C was prepared by charging 25 part of Formulation A, 276 part of Formulation B, 20 parts of Gasil 23F (silica), and 0.4 parts of Catiofast 269 into a container. The mixture was then coated onto a substrate. The resulting coating has L* 88.46, a*–3.95, b*–5.41, and after 24 hours, L* 87.52, a*–3.92, b*–4.64. The coating is inkjet and direct thermal printable.

Formulation D was prepared by charging 25 part of Formulation A, 276 part of Formulation B, and 0.4 parts of Catiofast 269 into a container. The mixture was then coated onto a substrate. The resulting coating has L* 92.46, a*–3.9, b* 0.2 and, after 24 hours, L* 91.66, a*–2.75, b*–0.72. The coating is inkjet and direct thermal printable.

Finally, formulation E was prepared. The container was charged 25 parts of Formulation A, 69 parts of Formulation B, 10 parts of Gasil 23, 0.2 parts Catiofast 269, and 40 parts of water. The resulting coating has L* 92.16, a*–1.64, b*–1.4, after 24 hours, L* 90.84, a*–3.06, b*–3.13. The coating is inkjet and direct thermal printable.

In each of the above formulations, adjustments may be made without departing from the invention. By way of non-limiting example, the amounts of each component may be varied by nominal amounts, e.g., +/–up to 10 wt. %. In the same manner, components may be substituted for others of similar composition or performance characteristics. The viability of these formulations and coatings may also be demonstrated qualitatively and quantitatively according to any variety of known absolute and comparative testing regimens.

Each step of the process, e.g. application of the coating, application of the adhesive and liner, and die-cutting of labels, may occur in any order combination relative to one another. In addition, reverse printing may also be utilized to print and form the labels. In an embodiment, distinct layers are not required, thereby simplifying the manufacturing operation to application of a single, homogenous topcoat.

Although the present embodiments have been illustrated in the accompanying drawings and described in the foregoing detailed description, it is to be understood that the invention is not to be limited to just the embodiments disclosed, and numerous rearrangements, modifications and substitutions are also contemplated. The exemplary embodiment has been described with reference to the preferred embodiments, but further modifications and alterations encompass the preceding detailed description. These modifications and alterations also fall within the scope of the appended claims or the equivalents thereof

What is claimed is:

1. A printable media, comprising:
   a facestock layer including a first face and an opposite second face; and
   a coating applied directly to said first face of the facestock layer and forming a topcoat layer of the printable media, wherein the coating comprises a leuco dye and an aqueous mixture and wherein the aqueous mixture includes at least one of the following: a developer, a sensitizer, polyvinylpyrrolidone, polyelectrolyte, polyvinyl alcohol, latex binder, or silica;
   wherein the printable media is configured to be processed by both a inkjet type printer and a direct thermal type printer.

2. The printable media of claim 1 further comprising:
   an adhesive applied to said second face of the facestock layer,
   a release liner applied to the adhesive.

3. The printable media of claim 2, further including at least one label die cut into the facestock layer, wherein the at least one label is selectively removable from the release liner.

4. The printable media of claim 2, wherein the adhesive is a pressure sensitive adhesive.

5. The printable media of claim 1, wherein the leuco dye comprises a fluoran dye.

6. The method of claim 1, wherein the coating is a homogenous coating.

7. A method for making a label sheet assembly, the method comprising:
   forming a facestock layer;
   applying a coating directly to a first side of the facestock layer to form a topcoat layer, wherein the coating comprises a leuco dye and an aqueous mixture, wherein the aqueous mixture includes at least one of the following: a developer, a sensitizer, polyvinylpyrrolidone, polyelectrolyte, polyvinyl alcohol, latex binder, or silica;
   applying an adhesive to a second side of the facestock layer;
   applying a release liner onto the adhesive;
   die cutting the facestock layer to form removable labels, wherein the label sheet assembly including the coating is configured to be processed by both an inkjet type printer and a direct thermal type printer.

8. The method of claim 7, wherein the method for making the label assembly is carried out at a temperature below an activation temperature of the leuco dye.

9. The method of claim 7 further comprising applying additional heat, pH, or light to the leuco dye to selectively activate the coating.

10. The method of claim 9, wherein selectively activating the coating results in a color change.

11. The method of claim 7, further comprising applying heat to the leuco dye to selectively activate the coating.

12. The method of claim 7, wherein the label assembly is printable on the coating by both an inkjet type printer and a direct thermal type printer.

13. The method of claim 7, wherein the leuco dye comprises a fluoran dye.

\* \* \* \* \*